US011275797B2

(12) United States Patent
Li

(10) Patent No.: US 11,275,797 B2
(45) Date of Patent: Mar. 15, 2022

(54) INFORMATION PROCESSING APPARATUS CORRECTING ACCESS FREQUENCY OF SHARED INFORMATION, INFORMATION PROCESSING SYSTEM, AND NON-TRANSITORY COMPUTER READABLE MEDIUM

(71) Applicant: FUJIFILM Business Innovation Corp., Tokyo (JP)

(72) Inventor: Yankun Li, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 176 days.

(21) Appl. No.: 16/706,855

(22) Filed: Dec. 9, 2019

(65) Prior Publication Data
US 2020/0311153 A1    Oct. 1, 2020

(30) Foreign Application Priority Data

Apr. 1, 2019 (JP) .............................. JP2019-070197

(51) Int. Cl.
| G06F 16/00 | (2019.01) |
| G06F 16/93 | (2019.01) |
| G06F 16/9038 | (2019.01) |
| G06F 16/9035 | (2019.01) |
| G06F 16/903 | (2019.01) |
| G06F 16/335 | (2019.01) |

(52) U.S. Cl.
CPC ............ G06F 16/93 (2019.01); G06F 16/335 (2019.01); G06F 16/9035 (2019.01); G06F 16/9038 (2019.01); G06F 16/90348 (2019.01)

(58) Field of Classification Search
CPC ..................................................... G06F 16/335
See application file for complete search history.

(56) References Cited

U.S. PATENT DOCUMENTS

2008/0298590 A1* 12/2008 Katar .................... H04L 12/413
                                                                380/258
2018/0216946 A1*  8/2018 Gueye ................... H04W 4/029

FOREIGN PATENT DOCUMENTS

JP            2006092023         4/2006

* cited by examiner

Primary Examiner — Ajith Jacob
(74) Attorney, Agent, or Firm — JCIPRNET

(57) ABSTRACT

An information processing apparatus includes a presentation unit that gives an importance level to shared information, which is information shared in a group including plural users, and presents the shared information, the importance level becoming higher as an access frequency of the shared information becomes higher a correction unit that, when the plural users in the group are changed and the presentation unit gives the importance level to the shared information, determines a user who has left or joined the group as a reserved user and corrects an access frequency of the shared information by the reserved user to a value calculated using a method different from a method used for the other users.

20 Claims, 12 Drawing Sheets

FIG. 7

DOCUMENT RANKINGS OF DEVELOPMENT GROUP

| RANKINGS | NUMBER OF OPERATIONS PERFORMED |
|---|---|
| DOCUMENT A | 20 (T: 10, J: 4, S: 3, H: 3) |
| DOCUMENT B | 15 (T: 5, J: 8, S: 1, H: 1) |
| DOCUMENT C | 12 (T: 2, J: 4, S: 4, H: 2) |
| DOCUMENT D | 5 (T: 1, J: 1, S: 1, H: 2) |

FIG. 8

DOCUMENT RANKINGS OF IP GROUP

| RANKINGS | NUMBER OF OPERATIONS PERFORMED |
|---|---|
| DOCUMENT W | 22 (Ki: 5, T: 10, N: 5, Ka: 2) |
| DOCUMENT X | 16 (Ki: 5, T: 8, N: 0, Ka: 3) |
| DOCUMENT Y | 10 (Ki: 1, T: 4, N: 3, Ka: 2) |
| DOCUMENT Z | 9 (Ki: 1, T: 1, N: 5, Ka: 2) |

FIG. 9

DOCUMENT RANKINGS OF DEVELOPMENT GROUP

| RANKINGS | NUMBER OF OPERATIONS PERFORMED |
|---|---|
| DOCUMENT A | 20 (T: 10, J: 4, S: 3, H: 3) |
| DOCUMENT B | 15 (T: 5, J: 8, S: 1, H: 1) |
| DOCUMENT C | 12 (T: 2, J: 4, S: 4, H: 2) |
| DOCUMENT D | 5 (T: 1, J: 1, S: 1, H: 2) |

GROUP MEMBERS: TARO, JIRO, SABURO, HANAKO

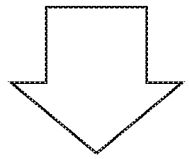

DOCUMENT RANKINGS OF DEVELOPMENT GROUP

| RANKINGS | NUMBER OF OPERATIONS PERFORMED |
|---|---|
| DOCUMENT A | 10 (J: 4, S: 3, H: 3) |
| DOCUMENT B | 10 (J: 8, S: 1, H: 1) |
| DOCUMENT C | 10 (J: 4, S: 4, H: 2) |
| DOCUMENT D | 4 (J: 1, S: 1, H: 2) |

GROUP MEMBERS: JIRO, SABURO, HANAKO

IMPORTANCE LEVELS OF DOCUMENTS A TO C ARE SAME

FIG. 10

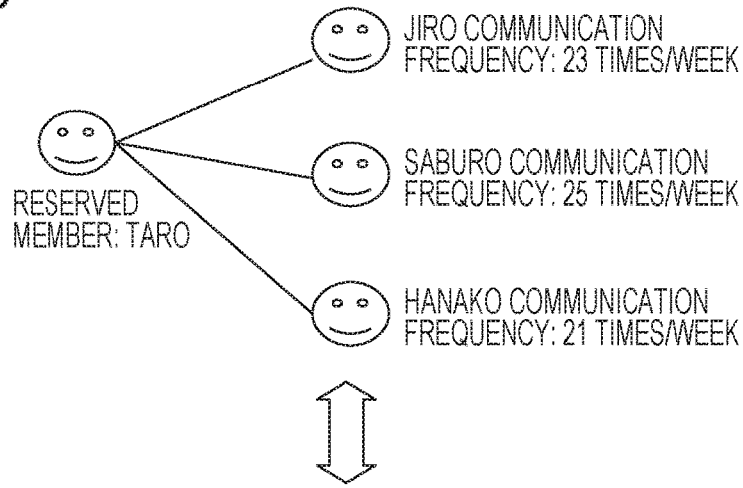

DOCUMENT RANKINGS OF DEVELOPMENT GROUP

| RANKINGS | NUMBER OF OPERATIONS PERFORMED | DOCUMENT IMPORTANCE LEVELS BASED ON COMMUNICATION FREQUENCIES WITH RESERVED MEMBER |
|---|---|---|
| DOCUMENT A | 20 (T: 10, J: 4, S: 3, H: 3) | CALCULATE DOCUMENT IMPORTANCE LEVELS USING COMMUNICATION FREQUENCIES BETWEEN RESERVED MEMBER AND OTHER MEMBERS AS WEIGHT FOR RESERVED MEMBER |
| DOCUMENT B | 15 (T: 5, J: 8, S: 1, H: 1) | |
| DOCUMENT C | 12 (T: 2, J: 4, S: 4, H: 2) | |
| DOCUMENT D | 5 (T: 1, J: 1, S: 1, H: 2) | |

GROUP MEMBERS: JIRO, SABURO, HANAKO        RESERVED MEMBER: TARO

FIG. 11

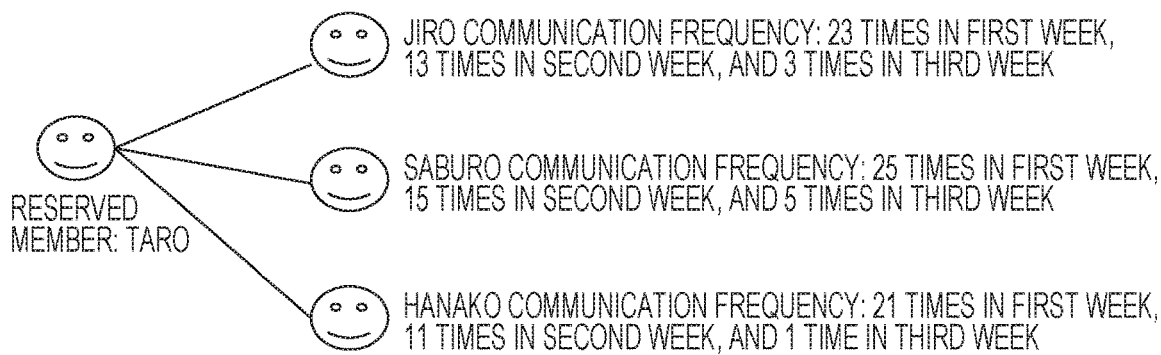

FIG. 12

ONE WEEK AFTER TARO LEFT

| COMMUNICATION FREQUENCY TABLE | TARO | JIRO | SABURO | HANAKO |
|---|---|---|---|---|
| TARO | 0 | 23 | 25 | 21 |
| JIRO | 23 | 0 | 40 | 30 |
| SABURO | 25 | 40 | 0 | 50 |
| HANAKO | 21 | 30 | 50 | 0 |

AVERAGE COMMUNICATION FREQUENCY CALCULATED BETWEEN GENERAL MEMBERS:
JIRO: (40 + 30)/2 = 35
SABURO: (40 + 50)/2 = 45
HANAKO: (30 + 50)/2 = 45
(35 + 45 + 40)/2 = 40

AVERAGE COMMUNICATION FREQUENCY BETWEEN RESERVED MEMBER (TARO) AND GENERAL MEMBERS:
HANAKO: (23 + 25 + 21)/3 = 23

FORMULA FOR CALCULATING WEIGHT FOR RESERVED MEMBER (TARO)
WEIGHT: 23/40 = 0.575

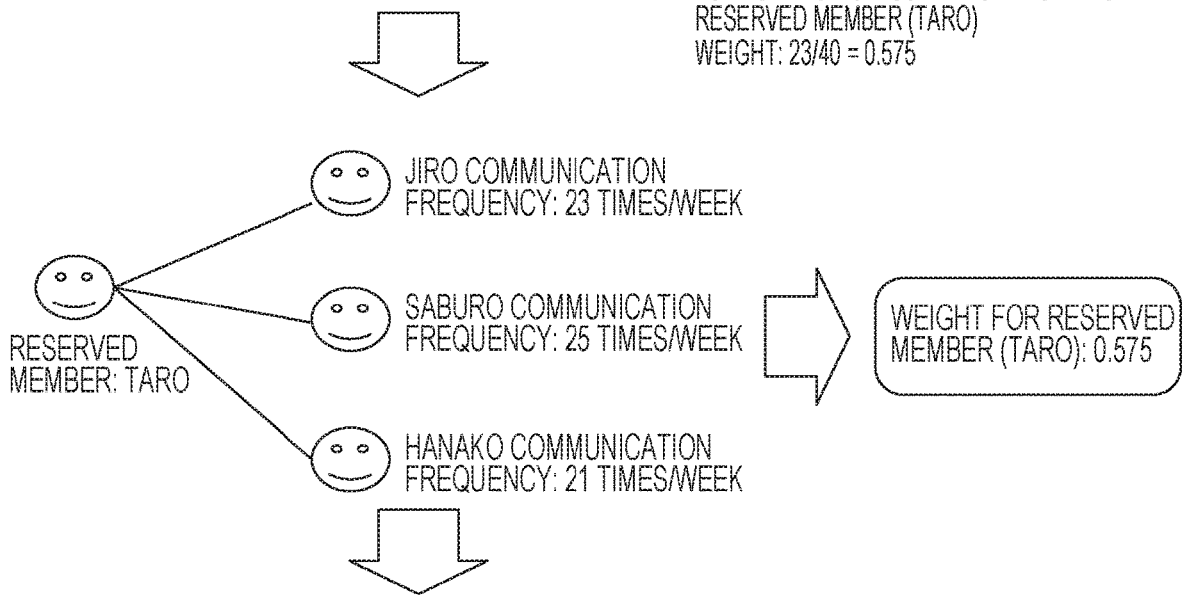

DOCUMENT RANKINGS OF DEVELOPMENT GROUP

| RANKINGS | DOCUMENT IMPORTANCE LEVELS BASED ON COMMUNICATION FREQUENCIES WITH RESERVED MEMBER |
|---|---|
| DOCUMENT A | 16 (T: 10*0.575, J: 4, S: 3, H: 3) |
| DOCUMENT B | 13 (T: 5*0.575, J: 8, S: 1, H: 1) |
| DOCUMENT C | 11 (T: 2*0.575, J: 4, S: 4, H: 2) |
| DOCUMENT D | 5 (T: 1*0.575, J: 1, S: 1, H: 2) |

GROUP MEMBERS: JIRO, SABURO, HANAKO    RESERVED MEMBER: TARO

FIG. 13

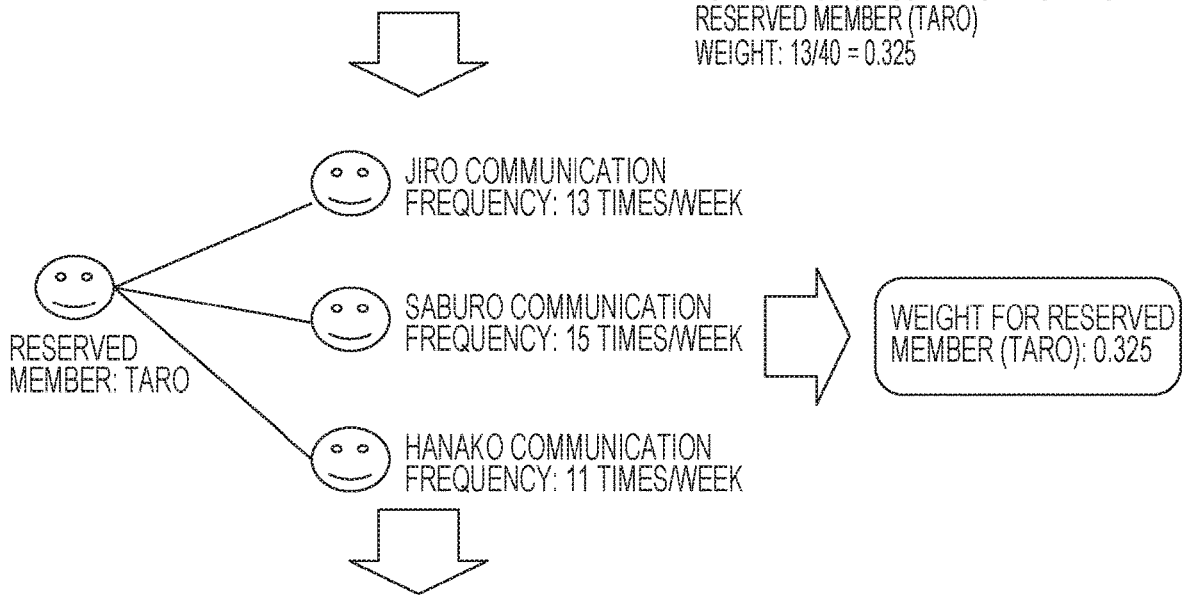

TWO WEEKS AFTER TARO LEFT

| COMMUNICATION FREQUENCY TABLE | TARO | JIRO | SABURO | HANAKO |
|---|---|---|---|---|
| TARO | 0 | 13 | 15 | 11 |
| JIRO | 13 | 0 | 40 | 30 |
| SABURO | 15 | 40 | 0 | 50 |
| HANAKO | 11 | 30 | 50 | 0 |

AVERAGE COMMUNICATION FREQUENCY CALCULATED BETWEEN GENERAL MEMBERS:
JIRO: (40 + 30)/2 = 35
SABURO: (40 + 50)/2 = 45
HANAKO: (30 + 50)/2 = 45
(35 + 45 + 40)/2 = 40

AVERAGE COMMUNICATION FREQUENCY BETWEEN RESERVED MEMBER (TARO) AND GENERAL MEMBERS:
HANAKO: (13 + 15 + 11)/3 = 13

FORMULA FOR CALCULATING WEIGHT FOR RESERVED MEMBER (TARO)
WEIGHT: 13/40 = 0.325

RESERVED MEMBER: TARO

JIRO COMMUNICATION FREQUENCY: 13 TIMES/WEEK
SABURO COMMUNICATION FREQUENCY: 15 TIMES/WEEK
HANAKO COMMUNICATION FREQUENCY: 11 TIMES/WEEK

WEIGHT FOR RESERVED MEMBER (TARO): 0.325

DOCUMENT RANKINGS OF DEVELOPMENT GROUP

| RANKINGS | DOCUMENT IMPORTANCE LEVELS BASED ON COMMUNICATION FREQUENCIES WITH RESERVED MEMBER |
|---|---|
| DOCUMENT A | 13 (T: 10*0.325, J: 4, S: 3, H: 3) |
| DOCUMENT B | 12 (T: 5*0.325, J: 8, S: 1, H: 1) |
| DOCUMENT C | 11 (T: 2*0.325, J: 4, S: 4, H: 2) |
| DOCUMENT D | 4 (T: 1*0.325, J: 1, S: 1, H: 2) |

GROUP MEMBERS: JIRO, SABURO, HANAKO    RESERVED MEMBER: TARO

|  | FIRST WEEK | SECOND WEEK | THIRD WEEK |
|---|---|---|---|
| COEFFICIENTS USED WHEN MEMBER LEAVES GROUP | 0.5 | 0.3 | 0 |
| COEFFICIENTS USED WHEN MEMBER JOINS GROUP | 0.3 | 0.5 | 1 |

INFORMATION PROCESSING APPARATUS CORRECTING ACCESS FREQUENCY OF SHARED INFORMATION, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-070197 filed Apr. 1, 2019.

BACKGROUND

(i) Technical Field

The present disclosure relates to an information processing apparatus, an information processing system, and a non-transitory computer readable medium.

(ii) Related Art

Japanese Unexamined Patent Application Publication No. 2006-092023 proposes ranking of documents useful for a user group using a document ranking condition specification unit that specifies a condition for displaying document rankings, a document ranking collection unit that obtains a reference history on the basis of the specified condition and that creates document rankings by collecting document scores for each document on the basis of a scoring rule weighted from a perspective of the user group, and a document ranking presentation unit that presents the document rankings created by the document ranking collection unit to users.

SUMMARY

When importance levels are given to information shared in a group including a plurality of users in accordance with access frequencies and the information is presented, the importance levels might undesirably change if the plurality of users are changed and access frequencies by a user who has left or joined the group are applied. Aspects of non-limiting embodiments of the present disclosure relate to an information processing apparatus, an information processing system, and a non-transitory computer readable medium capable of, if users in a group are changed, suppressing sharp changes in importance levels after the users are changed, compared to when importance levels are given while applying access frequencies by a user who has left or joined the group.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus comprising:

a presentation unit that gives an importance level to shared information, which is information shared in a group including a plurality of users, and presents the shared information, the importance level becoming higher as an access frequency of the shared information becomes higher and a correction unit that, when the plurality of users in the group are changed and the presentation unit gives the importance level to the shared information, determines a user who has left or joined the group as a reserved user and corrects an access frequency of the shared information by the reserved user to a value calculated using a method different from a method used for the other users.

BRIEF DESCRIPTION OF THE DRAWINGS

An exemplary embodiment of the present disclosure will be described in detail based on the following figures, wherein:

FIG. 7 is a diagram illustrating an example of document rankings of a development group;

FIG. 8 is a diagram illustrating an example of document rankings of an intellectual property (IP) group;

FIG. 9 is a diagram illustrating an example in which rankings of document information are generated for the development group by immediately reflecting movement of Taro;

FIG. 10 is a diagram illustrating correction of the number of operations performed using a weight calculated from communication frequencies;

FIG. 11 is a diagram illustrating the communication frequencies decreasing over time;

FIG. 12 is a diagram illustrating an example in which ranking information is generated by calculating a weight one week after Taro left the development group;

FIG. 13 is a diagram illustrating an example in which ranking information is generated by calculating a weight two weeks after Taro left the development group;

DETAILED DESCRIPTION

Figure 1:
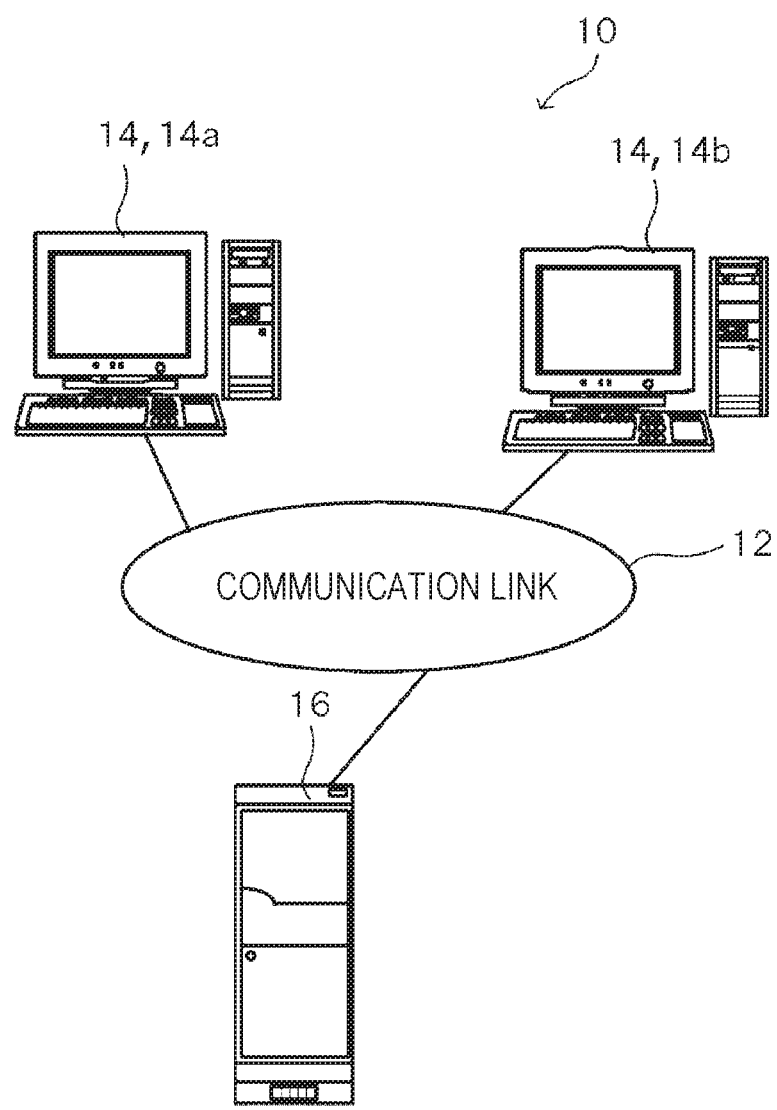
FIG. 1 is a diagram illustrating the schematic configuration of an information processing system according to an exemplary embodiment.

An example of an exemplary embodiment will be described hereinafter with reference to the drawings. The present exemplary embodiment will be described while taking, as an example, an information processing system in which a plurality of information processing apparatuses and a server are connected to one another through one of various communication links such as networks. FIG. 1 is a diagram illustrating the schematic configuration of an information processing system 10 according to the present exemplary embodiment.

As illustrated in FIG. 1, the information processing system 10 according to the present exemplary embodiment includes a plurality of information processing terminals 14*a*, 14*b*, and so on as client apparatuses and a cloud server 16 as an information processing apparatus. When the information processing terminals 14*a*, 14*b*, and so on need not be distinguished from one another, the alphabets at ends of the reference numerals might be omitted. Although the plurality of information processing terminals 14*a*, 14*b*, and so on are included in the present exemplary embodiment, only one information processing terminal 14 may be included, instead. In addition, although only one cloud server 16 is included in the present exemplary embodiment, a plurality of cloud servers 16 may be included, instead.

The information processing terminals 14 and the cloud server 16 are connected to one another through a communication link 12 such as a local area network (LAN), a wide area network (WAN), the Internet, or an intranet. The information processing terminals 14 and the cloud server 16 can communicate various pieces of data with one another through the communication link 12. The information processing terminals 14 may each be one of various mobile terminals such as smartphones.

The information processing system 10 according to the present exemplary embodiment provides, as a cloud service, a content management service for managing documents. In the content management service, for example, the information processing terminals 14 can access the cloud server 16 to, for example, store various pieces of document information in the cloud server 16 as shared information and view document information stored in and managed by the cloud server 16. It is assumed that the document information stored in the cloud server 16 also includes image information and other types of information that are not related to documents.

Although the cloud server 16 according to the present exemplary embodiment provides a collaboration service, which will be described later, the collaboration service may be provided by another cloud server 16, instead.

Figure 2:
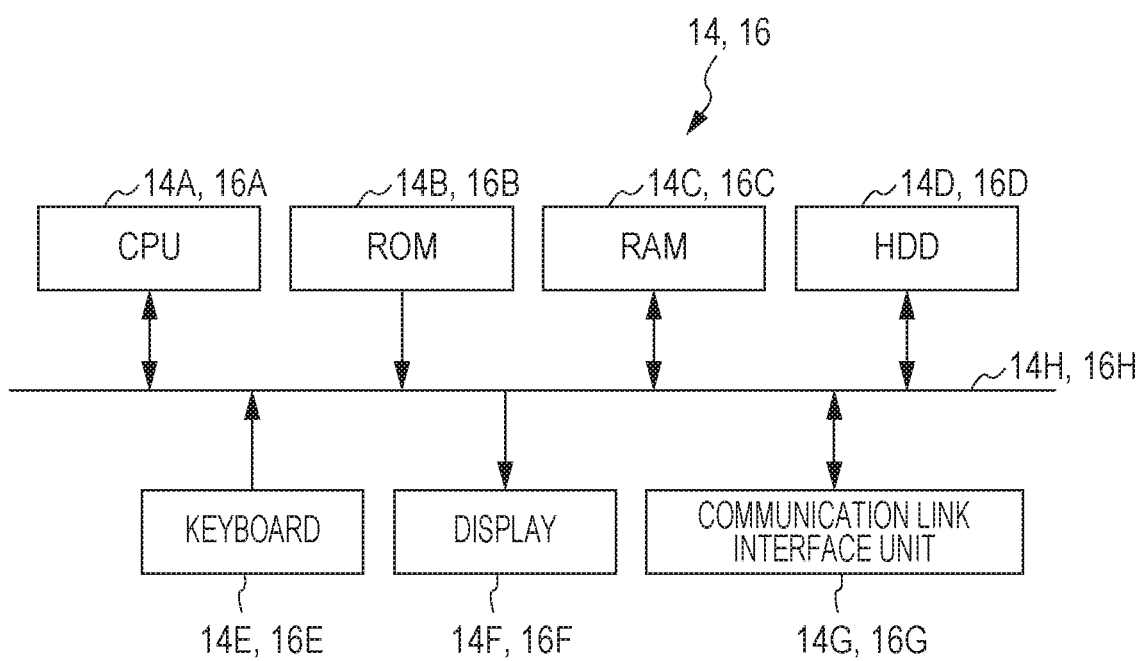
FIG. 2 is a block diagram illustrating the configuration of an electrical system of information processing terminals and a cloud server in the information processing system according to the exemplary embodiment.

Next, the configuration of an electrical system of the information processing terminals 14 and the cloud server 16 according to the present exemplary embodiment will be described. FIG. 2 is a block diagram illustrating the configuration of the electrical system of the information processing terminals 14 and the cloud server 16 in the information processing system 10 according to the present exemplary embodiment. The information processing terminals 14 and the cloud server 16 are basically achieved by general computers, and the information processing terminals 14 will be taken as an example.

As illustrated in FIG. 2, the information processing terminals 14 according to the present exemplary embodiment 14 includes a central processing unit (CPU) 14A, a read-only memory (ROM) 14B, a random-access memory (RAM) 14C, a hard disk drive (HDD) 14D, a keyboard 14E, a display 14F, and a communication link interface 14G. The CPU 14A controls the operation of the entirety of the information processing terminals 14. The ROM 14B stores various control programs and parameters and the like in advance. The RAM 14C is used by the CPU 14A as a working area for executing the various programs. The HDD 14D stores various pieces of data, various application programs, and the like. The keyboard 14E is used to input various pieces of information. The display 14F is used to display various pieces of information. The communication link interface 14G is connected to the communication link 12 and communicates various pieces of data with the other apparatuses connected to the communication link 12. The above components of each information processing terminal 14 are electrically connected to one another by a system bus 14H. Although the HDD 14D is used as a storage unit in the information processing terminals 14 according to the present exemplary embodiment, another nonvolatile storage unit such as a flash memory may be used, instead.

With this configuration of the information processing terminals 14 according to the present exemplary embodiment, the CPU 14A accesses the ROM 14B, the RAM 14C, and the HDD 14D, obtains various pieces data through the keyboard 14E, and displays various pieces of information on the display 14F. The information processing terminal 14 controls communication of data through the communication link interface 14G using the CPU 14A.

In the information processing system 10 according to the present exemplary embodiment configured as above, the cloud server 16 provides, as a cloud service, the content management service for managing documents as described above. The cloud server 16 manages documents by, for example, moving the information stored in the information processing terminals 14 to the cloud server 16 as document information to be managed.

In the present exemplary embodiment, the collaboration service provided by the cloud server 16 is one of various services for communicating information between users, such as a bulletin board service, a chat service, or an electronic mail service.

Figure 3:
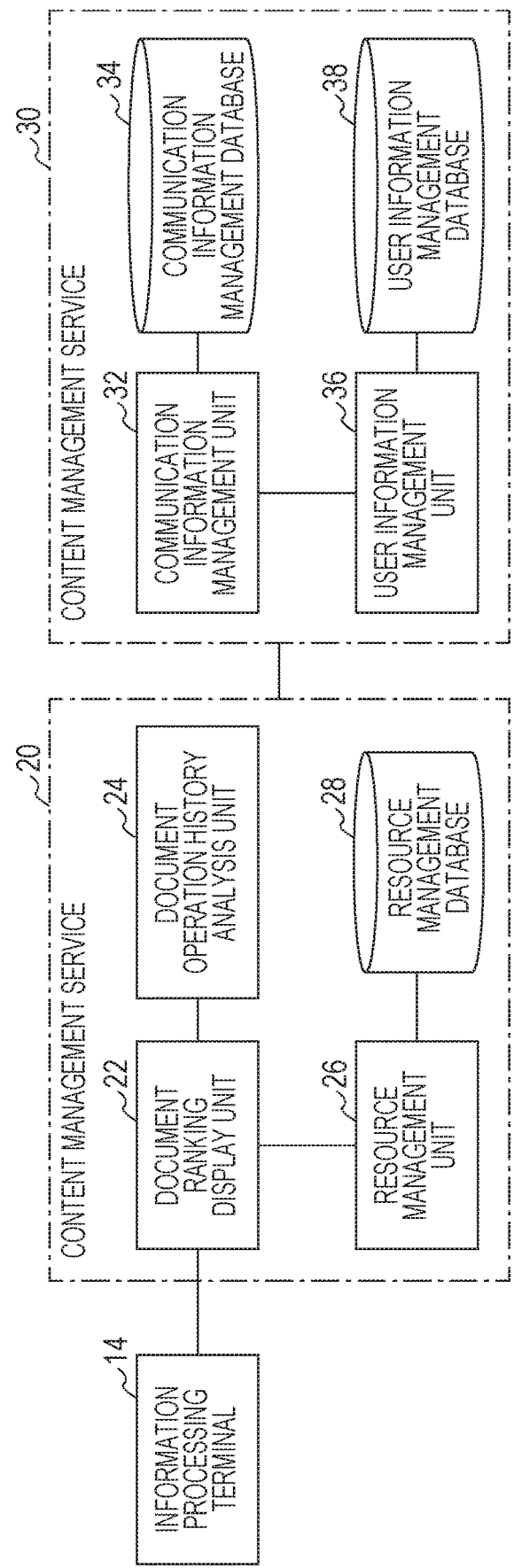
FIG. 3 is a functional block diagram illustrating functions of a content management service and a collaboration service provided by the cloud server in the information processing system according to the exemplary embodiment.

Next, the functional configuration of the cloud server 16 in the information processing system 10 according to the present exemplary embodiment described above will be described. FIG. 3 is a functional block diagram illustrating functions of the content management service and the collaboration service provided by the cloud server 16 in the information processing system 10 according to the present exemplary embodiment.

As described above, the cloud server 16 has functions of a content management service 20 and a collaboration service 30.

The content management service 20 has functions of a document ranking display unit 22, a document operation history analysis unit 24, a resource management unit 26, and a resource management database 28.

The document ranking display unit 22 performs a process for displaying, on an information processing terminal 14 operated by a registered user, ranking information based on operation histories of document information obtained as a result of an analysis conducted by the document operation history analysis unit 24.

The document operation history analysis unit 24 refers to operation histories of document information managed by the content management service 20 and generates ranking information by ranking the document information. For example, the document operation history analysis unit 24 refers to operation histories of document information by members of a group to which a registered user belongs obtains access frequencies of the document information, and generates ranking information in which higher importance levels are given to document information having higher access frequencies.

The resource management unit 26 performs, in accordance with a request from a registered user, a process for registering document information to the resource management database 28 for each of groups to which the registered user belongs. The resource management unit 26 also performs, in accordance with a request from the registered user, a process for reading document information from the resource management database 28.

The collaboration service 30, on the other hand, has functions of a communication information management unit 32, a communication information management database 34, a user information management unit 36, and a user information management database 38.

The communication information management unit 32 manages communication between registered users by detecting communication of information between the registered users. For example, the communication information management unit 32 detects the number of times of communication of information between the registered users or the like as communication frequencies by detecting the number of times of communication of information between the registered users and registers the communication frequencies to the communication information management database 34. More specifically, the communication information management unit 32 detects the number of times of communication of information between the registered users as communication frequencies between the registered users on the basis of histories of a bulletin board service, a social networking service (SNS) such as a chat service, an electronic mail service, or the like.

The communication information management database 34 stores information such as the communication histories between the registered users detected by the communication information management unit 32.

The user information management unit 36 manages user identifiers (IDs) for identifying the users and user information such as passwords. The user information management unit 36 authenticates the users on the basis of the user information and identifies the users, groups to which the users belong, and the like. The user information management unit 36 then transmits a result of the identification to the communication information management unit 32, and the communication information management unit 32 manages the communication frequencies between the users.

The user information management database 38 stores the user information regarding the registered users used by the user information management unit 36 to identify the users.

The collaboration service 30 may include an authentication service, which is used to authenticate users, or the authentication service may be provided by another cloud service.

As described above, when the document information managed by the content management service 20 is viewed in the information processing system 10 according to the present exemplary embodiment, the document ranking display unit 22 displays, on an information processing terminal 14, ranking information based on operation histories of document information. In the present exemplary embodiment, rankings based on operation histories of document information are displayed for each of groups to which a user belongs, but the rankings undesirably change greatly if operation histories of a member who has just joined or left the group are immediately reflected by the ranking information. That is, operation histories of a person who has left the group are not referred to, and operation histories of a person who has just joined the group become noise.

In the present exemplary embodiment, therefore, if members of a group are changed before operation histories of document information managed by the content management service 20 are referred to and ranking information is generated, the document operation history analysis unit 24 suppresses variation in rankings before and after the change. More specifically, if members of a group are changed and importance levels are given to document information, the document operation history analysis unit 24 determines a user who has joined or left the group as a reserved user and corrects access frequencies of document information by the reserved user to a value calculated using a method different from one used for the other users. As a result, even if members of a group are changed due to reorganization or the like, rankings do not greatly vary before and after the change.

More specifically, the document operation history analysis unit 24 determines, as a reserved member, a person who moves (a person who has joined or left a group) due to reorganization and changes a weight for operation histories of the reserved member on the basis of communication frequencies with the other members of the group, the communication frequencies changing over time. In general, a communication frequency with a reserved member who has left a group gradually decreases over time for a certain period of time. A communication frequency with a reserved member who has just joined a group, on the other hand, gradually increases over time for a certain period of time. The document operation history analysis unit 24 therefore suppresses variation in rankings before and after a change in members of a group by obtaining a communication frequency calculated by the collaboration service 30 and changing, on the basis of the communication frequency, a weight for operation histories of a person who moves.

If a communication frequency between a person who has left a group and other group members falls below a predetermined threshold or a certain period of time has elapsed since the person left the group, the document operation history analysis unit 24 removes the person as a reserved member and generates ranking information.

If a communication frequency between a person who has newly joined a group and other group members becomes equal to or higher than a predetermined threshold or a certain period of time has elapsed since the person joined the group, the document operation history analysis unit 24 changes a status of the person from a reserved member to a general member and generates ranking information.

The document ranking display unit 22 and the document operation history analysis unit 24 correspond to a presentation unit, and the document operation history analysis unit 24 corresponds to a correction unit.

Figure 4:
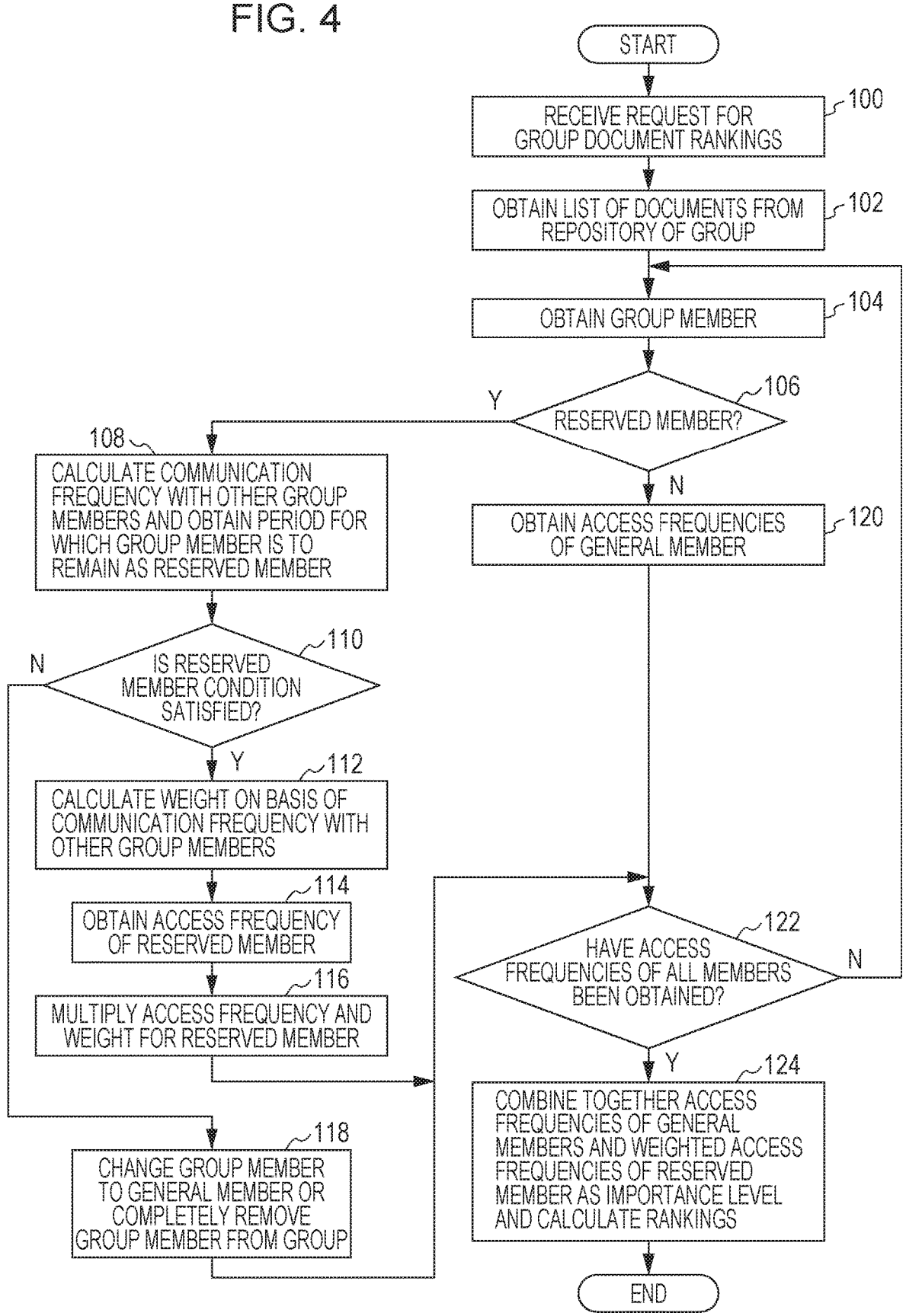
FIG. 4 is a flowchart illustrating an example of a process performed when the cloud server of the information processing system according to the present exemplary embodiment provides the content management service.

Next, a specific process performed when the cloud server 16 of the information processing system 10 according to the present exemplary embodiment configured as above provides the content management service 20 will be described. FIG. 4 is a flowchart illustrating an example of the process performed when the cloud server 16 of the information processing system 10 according to the present exemplary embodiment provides the content management service 20. The process illustrated in FIG. 4 starts, for example, when viewing of document information is requested on a predetermined initial screen of the content management service 20 using the information processing terminal 14.

In step 100, the document ranking display unit 22 receives a request for group document rankings, and the process proceeds to step 102. For example, the information processing terminal 14 is used on the predetermined initial screen to request the group document rankings, and the request is received.

In step 102, the resource management unit 26 obtains, in the document information stored in the resource management database 28, a list of documents from a repository of a group to which a user who has requested the group document rankings belongs. The process then proceeds to step 104.

In step 104, the document operation history analysis unit 24 obtains a target group member among group members, and the process proceeds to step 106.

In step 106, the document operation history analysis unit 24 determines whether the target group member is a reserved member. The document operation history analysis unit 24 makes the determination, for example, on the basis of a result obtained by the user information management unit 36 by checking the user information stored in the user information management database 38, the result being obtained by communicating with the collaboration service 30. Alternatively, information regarding a change in the group is stored in the resource management database 28, and whether the target group member is a reserved member is determined by communicating with the resource management unit 26. If a result of the determination is positive, the process proceeds to step 108, and if not, the process proceeds to step 120.

In step 108, the document operation history analysis unit 24 calculates a communication frequency between the target group member and the other group members and obtains a period for which the target group member is to remain as a reserved member. The process then proceeds to step 110. Here, for example, the document operation history analysis unit 24 inquires, of the collaboration service 30, a communication frequency between the target group member and the other group members and obtains the communication frequency calculated by the communication information management unit 32 and a period for which the target member is to remain as a reserved member.

In step 110, the document operation history analysis unit 24 determines whether a reserved member condition is satisfied. When the reserved member is a person who has left the group, whether the communication frequency with the other group members is higher than a predetermined threshold or whether a period of time that has elapsed since the target group member left the group is shorter than a predetermined period of time is determined. When the reserved member is a person who has newly joined the group, on the other hand, whether the communication frequency with the other group members is lower than a predetermined threshold or whether a period of time that has elapsed since the target group member joined the group is shorter than a predetermined period of time. If so, the process proceeds to step 112, and if not, the process proceeds to step 118.

In step 112, the document operation history analysis unit 24 calculates a weight on the basis of the communication frequency between the target group member and the other group members. For example, a weight is calculated using an average communication frequency that is an average of communication frequencies between general members and an average communication frequency that is an average of communication frequencies between the reserved member and the general members. More specifically, a weight is calculated by dividing the average of the communication frequencies between the reserved member and the general members by the average of the communication frequencies between the general members.

In step 114, the document operation history analysis unit 24 obtains access frequencies, by the reserved member, of the document information stored in the resource management database 28 from the resource management unit 26. The process then proceeds to step 116.

In step 116, the document operation history analysis unit 24 corrects the access frequencies by the reserved member by multiplying the access frequencies and the weight together. The process then proceeds to step 122.

In step 118, the document operation history analysis unit 24 changes a status of the target group member from a reserved member to a general member or completely removes the target group member from the group. That is, when the reserved member is a member who has joined the group, the status of the member is changed to a general member, and when the reserved member is a member who has left the group, the member is removed from the group.

In step 122, on the other hand, whether the document operation history analysis unit 24 has obtained access frequencies of all the group members is determined. If not, the process returns to step 104, and the above process is repeated. If so, the process proceeds to step 124.

In step 124, the document operation history analysis unit 24 calculates, for the document information, rankings while determining combinations of the access frequencies by the general members and the weighted access frequencies of the reserved member as importance levels. The process thus ends.

Figure 5:
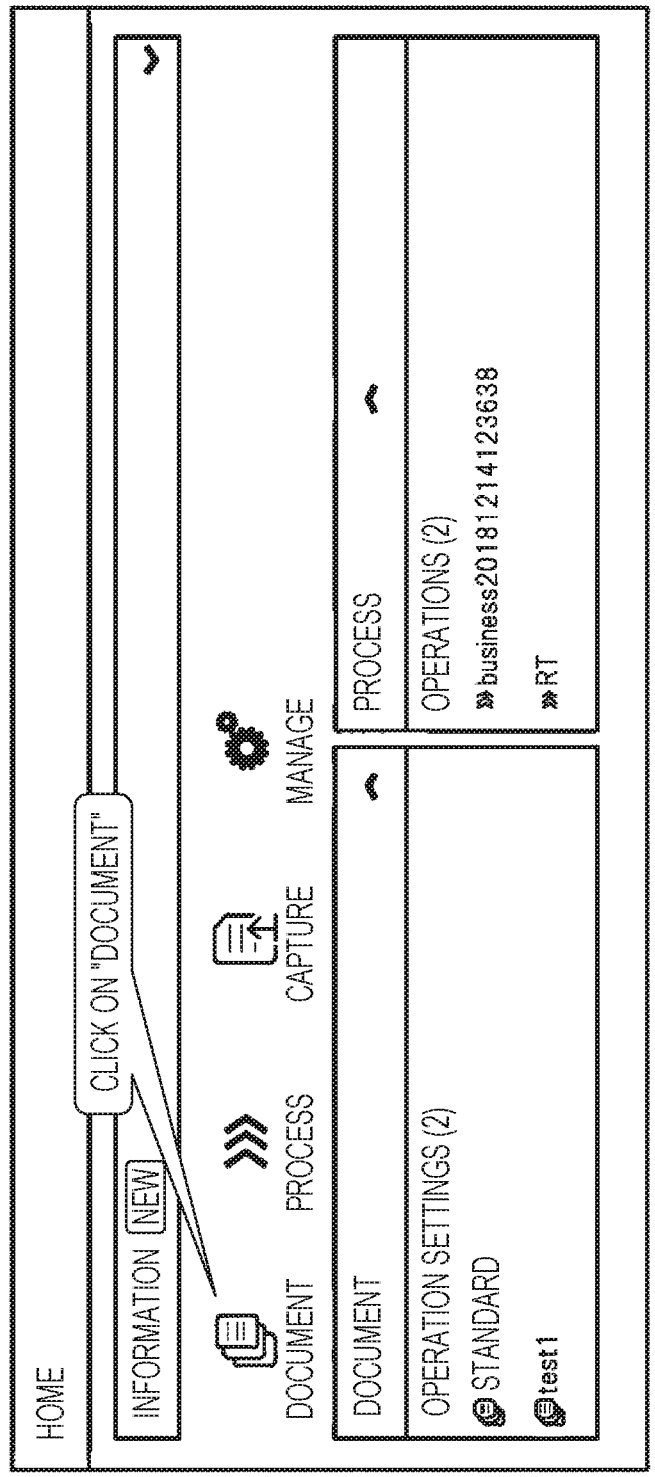
FIG. 5 is a diagram illustrating an example of an initial screen provided by the content management service.

Next, a specific example of the above-described process performed by the content management service 20 will be described. FIG. 5 is a diagram illustrating an example of the initial screen provided by the content management service 20.

In the initial screen illustrated in FIG. 5, for example, a user operates an information processing terminal 14 to click on "document". As a result, the process illustrated in FIG. 4 starts, and the document operation history analysis unit 24 generates ranking information.

Figure 6:
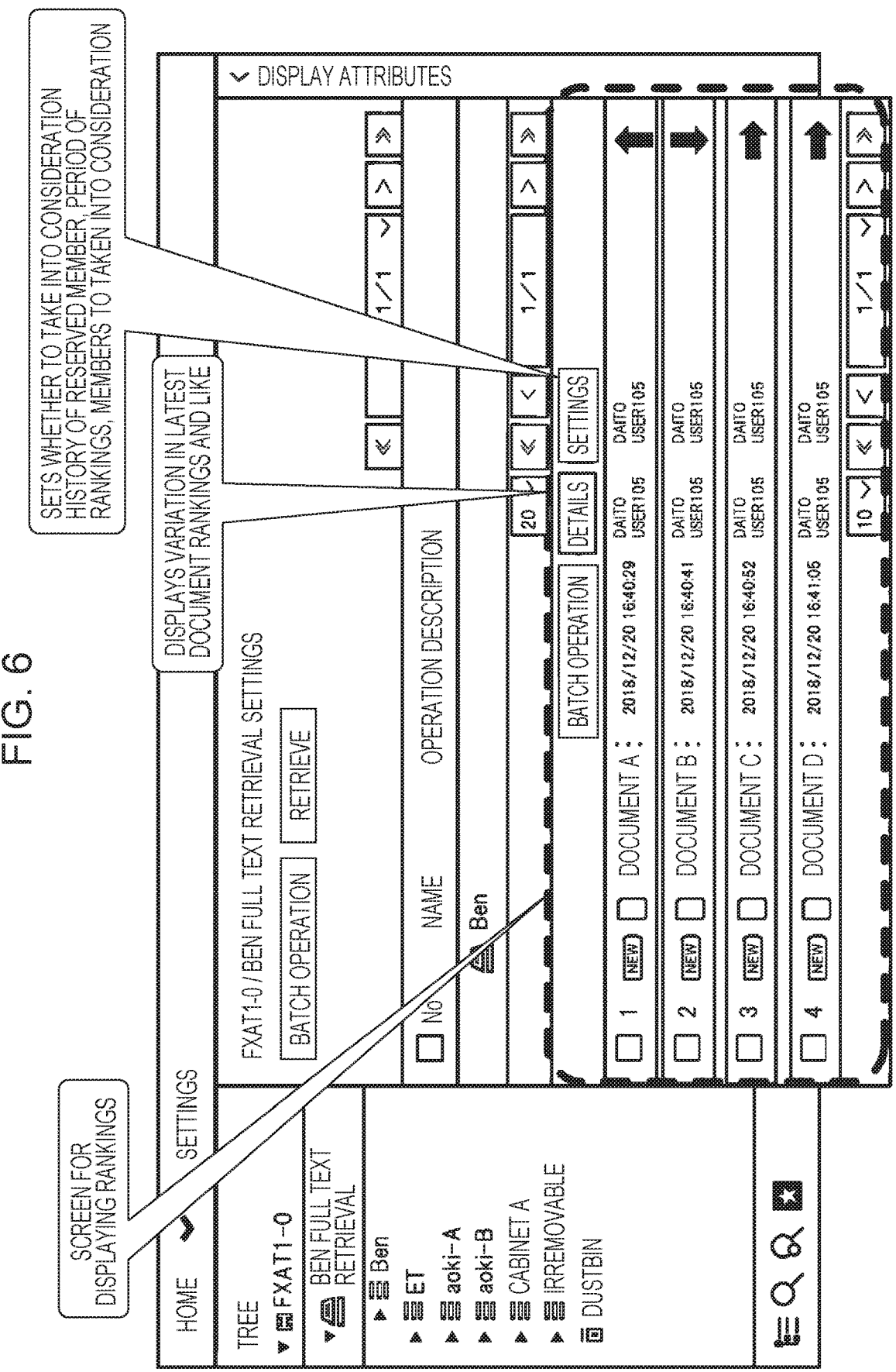
FIG. 6 is a diagram illustrating an example of displayed ranking information.

After the ranking information is generated, the document ranking display unit 22 displays the ranking information on the information processing terminal 14 that has requested the ranking information. As indicated by a broken line in FIG. 6, for example, rankings of importance levels of document information are displayed. FIG. 6 illustrates an example of rankings in which documents A, B, C, and D are ranked in this order. In the example illustrated in FIG. 6, arrow images indicate that document A has risen in the rankings, document B has fallen in the rankings, and documents C and D remain the same. If a "details" button is used in FIG. 6, latest variation in the document rankings and the like are displayed, and if a "settings" button is used, a screen for making a setting of whether to take into consideration histories of a reserved member, a setting of a period of the rankings, a setting of members to be taken into consideration, and the like. When the "settings" button is used, end conditions (e.g., a correction period and a threshold) for ending correction of access frequencies of a reserved member may also be set.

It is assumed that a development group including four members, namely Taro, Jiro, Saburo, and Hanako, and an IP group including four members, namely Kimura, Tamura, Nakamura, and Kawamura, are registered in the content management service 20.

As illustrated in FIG. 7, documents A, B, C, and D are ranked in this order in document rankings of the development group. It is also assumed that the number of operations performed on documents A, B, C, and D is 20 (Taro: 10, Jiro 4, Saburo: 3, Hanako: 3), 15 (Taro: 5, Jiro 8, Saburo: 1, Hanako: 1), 12 (Taro: 2, Jiro 4, Saburo: 4, Hanako: 2), and 5 (Taro: 1, Jiro 1, Saburo: 1, Hanako: 2), respectively. As illustrated in FIG. 8, documents W, X, Y, and Z are ranked in this order in document rankings of the IP group. It is also assumed that the number of operations performed on documents W, X, Y, and Z are 22 (Kimura: 5, Tamura: 10, Nakamura: 5, Kawamura: 2), 16 (Kimura: 5, Tamura: 8, Nakamura: 0, Kawamura: 3), 10 (Kimura: 1, Tamura: 4, Nakamura: 3, Kawamura: 2), and 9 (Kimura: 1, Tamura: 1, Nakamura: 5, Kawamura: 2), respectively.

A case where Taro, who belonged to the development group, has moved to the IP group will be described hereinafter as an example.

As a result of the movement of Taro, the development group now includes Jiro, Saburo, and Hanako. If the movement of Taro is immediately reflected, the rankings of documents A to D in terms of the number of operations performed change and importance levels of documents A to C become the same as illustrated in FIG. 9. In the example illustrated in FIG. 9, the number of operations performed on document A has decreased from 20 to 10, the number of operations performed on document B has decreased from 15 to 10, the number of operations performed on document C has decreased from 12 to 10, and the number of operations performed on document D has decreased from 5 to 4 as a result of the movement of Taro.

In the present exemplary embodiment, therefore, Taro is determined as a reserved member, and communication frequencies between the reserved member and the other members are obtained from the collaboration service 30. Document importance levels are then calculated using a weight for the reserved member on the basis of the communication frequencies between the reserved member and the other members as illustrated in FIG. 10. For example, the weight is calculated using the communication frequencies between the reserved member and the other members, and the number of operations performed by the reserved member is corrected using the weight. As illustrated in FIG. 11, the communication frequencies between the reserved member and the other members generally decrease over time. As the communication frequencies decrease, the number of operations performed by the reserved member corrected using the weight also decreases. As a result, an effect of the movement of Taro is suppressed compared to when the correction is not performed.

Taro is also determined as a reserved member in the IP group, to which Taro has moved. Taro uses various pieces of the document information since he is in a new environment, but communication frequencies are low because he is not accustomed to the environment compared to the other members. A weight is determined on the basis of the communication frequencies between Taro and the other members. The number of operations performed by Taro is then corrected using the weight. If a certain period of time has elapsed since Taro joined the IP group or if the communication frequency with the other members is equal to or higher than a predetermined threshold, a status of Taro is changed from a reserved member to a general member. Taro is treated as a general member thereafter. In this case, the effect of the movement of Taro is suppressed compared to when the correction is not performed.

Here, an example of calculation of a weight for Taro, who is the reserved member, will be described. FIG. 12 is a diagram illustrating an example in which ranking information is generated by calculating a weight one week after Taro left the development group.

The weight is calculated using an average communication frequency that is an average of communication frequencies between general members and an average communication frequency that is an average of communication frequencies between the reserved member and the general members.

In the example illustrated in FIG. 12, an average communication frequency between Jiro and the other general member is (40+30)/2=35, because a communication frequency between Jiro and Saburo is 40 and a communication frequency between Jiro and Hanako is 30. An average communication frequency between Saburo and the other general members is (40+50)/2=45, because the communication frequency between Saburo and Jiro is 40 and a communication frequency between Saburo and Hanako is 50. An average communication frequency between Hanako and the other general members is (30+50)/2=40, because the communication frequency between Hanako and Jiro is 30 and the communication frequency between Hanako and Saburo is 50. The average communication frequency between the general members, therefore, is (35+45+40)/3=40.

A communication frequency between Taro, who is the reserved member, and Jiro is 23, a communication frequency between Taro and Saburo is 25, and a communication frequency between Taro and Hanako is 21. The average communication frequency between Taro, who is the reserved member, and the general members, therefore, is (23+25+21)/3=23.

The weight is obtained by dividing the average of the communication frequencies between the general members and the reserved member by the average of the communication frequencies between the general members. In the example illustrated in FIG. 12, 23/40=0.575.

The number of operations performed by Taro, who is the reserved member, is corrected using the weight. As illustrated in FIG. 12, the number of operations performed on documents A, B, C, and D after the correction are 16, 13, 11, and 5, respectively. Compared to the example illustrated in FIG. 9, the effect of the movement of Taro is suppressed.

FIG. 13 is a diagram illustrating an example in which ranking information is generated by calculating a weight two weeks after Taro left the development group.

Two weeks after the movement of Taro, the average communication frequency between Jiro and the other general member is (40+30)/2=35, because the communication frequency between Jiro and Saburo is 40 and the communication frequency between Jiro and Hanako is 30. The average communication frequency between Saburo and the other general members is (40+50)/2=45, because the communication frequency between Saburo and Jiro is 40 and the communication frequency between Saburo and Hanako is 50. The average communication frequency between Hanako and the other general members is (30+50)/2=40, because the communication frequency between Hanako and Jiro is 30 and the communication frequency between Hanako and Saburo is 50. The average communication frequency between the general members, therefore, remains the same, namely (35+45+40)/3=40.

The communication frequency between Taro, who is the reserved member, and Jiro is 13, the communication frequency between Taro and Saburo is 15, and the communication frequency between Taro and Hanako is 11. The average communication frequency between Taro, who is the reserved member, and the general members, therefore, is (13+15+11)/3=13.

The weight is obtained by dividing the average of the communication frequencies between the general members and the reserved member by the average of the communication frequencies between the general members. In the example illustrated in FIG. 13, 13/40=0.325.

The number of operations performed by Taro, who is the reserved member, are corrected using the weight. As illustrated in FIG. 13, the number of operations performed on documents A, B, C, and D after the correction are 13, 12, 11, and 4, respectively. Compared to the example illustrated in FIG. 12, the effect of the movement of Taro is gradually reflected.

Figures 14, 15:
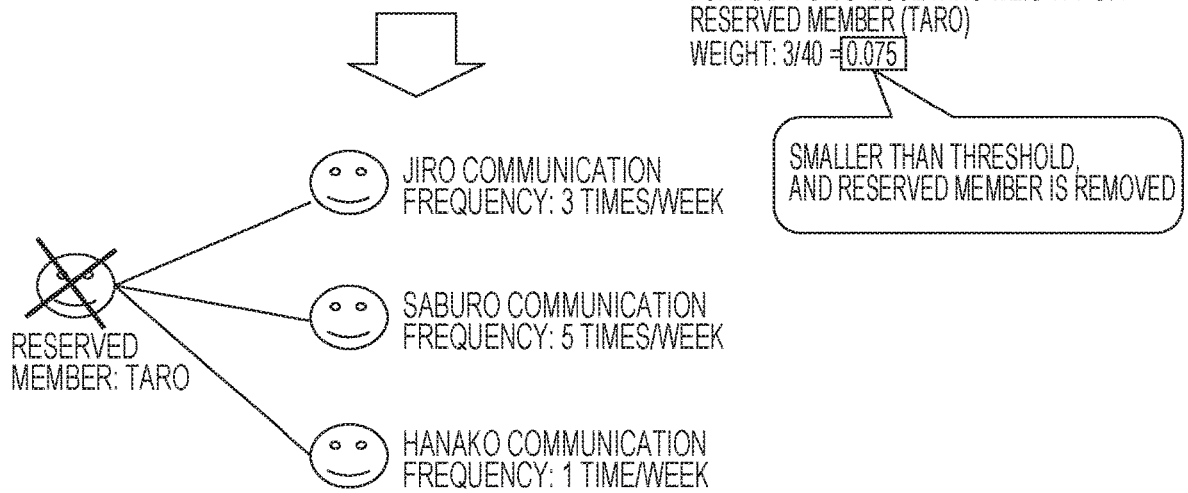
FIG. 14 is a diagram illustrating an example in which ranking information is generated by calculating a weight three weeks after Taro left the development group.
FIG. 15 is a diagram illustrating an example of a predetermined coefficient that changes over time after a reserved member is determined.

FIG. 14 is a diagram illustrating an example in which ranking information is generated by calculating a weight three weeks after Taro left the development group.

Three weeks after the movement of Taro, the average communication frequency between Jiro and the other general member is (40+30)/2=35, because the communication frequency between Jiro and Saburo is 40 and the communication frequency between Jiro and Hanako is 30. The average communication frequency between Saburo and the other general members is (40+50)/2=45, because the communication frequency between Saburo and Jiro is 40 and the communication frequency between Saburo and Hanako is 50. The average communication frequency between Hanako and the other general members is (30+50)/2=40, because the communication frequency between Hanako and Jiro is 30 and the communication frequency between Hanako and Saburo is 50.

The average communication frequency between the general members, therefore, remains the same, namely (35+45+40)/3=40.

The communication frequency between Taro, who is the reserved member, and Jiro is 3, the communication frequency between Taro and Saburo is 5, and the communication frequency between Taro and Hanako is 1. The average communication frequency between Taro, who is the reserved member, and the general members, therefore, is (3+5+1)/3=3.

The weight is obtained by dividing the average of the communication frequencies between the general members and the reserved member by the average of the communication frequencies between the general members. In the example illustrated in FIG. 14, 3/40=0.075. When a threshold of 0.05 or less is employed as a condition for removing a reserved member, for example, the reserved member is removed.

An effect of movement of a reserved member is thus suppressed by setting the reserved member, correcting operation histories of the reserved member on the basis of communication frequencies that change over time, and generating ranking information, compared to when the correction is not performed. In addition, the effect of the movement of the reserved member is gradually reflected over time.

An example in which access frequencies are corrected by obtaining a weight for a reserved member once a week, which is predetermined time intervals, in the above exemplary embodiment. The predetermined time intervals, however, is not limited to one week. For example, another set of time intervals, such as one day or one month, may be used, instead.

In addition, although an example in which a weight is calculated using communication frequencies between users and access frequencies of document information by a reserved member are corrected using the weight has been described in the above exemplary embodiment, a correction method is not limited to this. For example, the document operation history analysis unit 24 may correct access frequencies of document information by a reserved member using a predetermined coefficient, instead of a weight, that changes over time after a reserved member is determined. In this case, when a user in a group leaves the group, a coefficient that decreases over time after the user is determined as a reserved member may be used. When a user joins a group, on the other hand, a coefficient that increases over time after the user is determined as a reserved member may be used. For example, the coefficient may be a group of fixed values set for different time periods or a value that varies depending on an overall access frequency or the like. When a coefficient is used, a weight need not be calculated. For example, coefficients when a member leaves a group and coefficient when a member joins a group are used as illustrated in FIG. 15. In the example illustrated in FIG. 15, the coefficients when a member leaves a group are 0.5, 0.3, and 0 one week, two weeks, and three weeks, respectively, after the member leaves, and then a reserved member is removed. The coefficients when a member joins a group are 0.3, 0.5, and 1 one week, two weeks, and three weeks, respectively, after the member joins, and then the reserved member is changed to a general member. The coefficients illustrated in FIG. 15 are an example, and the coefficients used are not limited to these.

The process performed by the cloud server 16 according to the above exemplary embodiment may be achieved by software or hardware, or a combination of software and hardware. The process performed by the cloud server 16 may be stored in a storage medium as a program and distributed.

The present disclosure is not limited to the above exemplary embodiment. The above exemplary embodiment may be modified in various ways without deviating from the scope of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a storage medium; and
a processor, coupled to the storage medium, wherein the processor is configured to function as:
a presentation unit that gives an importance level to shared information, which is information shared in a group including a plurality of users, and presents the shared information, the importance level becoming higher as an access frequency of the shared information becomes higher; and
a correction unit that, when the plurality of users in the group are changed and the presentation unit gives the importance level to the shared information, determines a user who has left or joined the group as a reserved user and corrects an access frequency of the shared information by the reserved user to a value calculated using a method different from a method used for the other users.

2. The information processing apparatus according to claim 1,
wherein the correction unit corrects the access frequency of the shared information by the reserved user using communication frequencies between the reserved user and the other users in the group.

3. The information processing apparatus according to claim 2, wherein the correction unit obtains a weight using the communication frequencies and corrects the access frequency of the shared information by the reserved user using the obtained weight.

4. The information processing apparatus according to claim 3,
wherein the correction unit obtains the weight at predetermined time intervals and corrects the access frequency of the shared information.

5. The information processing apparatus according to claim 3,
wherein the correction unit obtains the weight by dividing an average of the communication frequencies between the other users and the reserved user by an average of communication frequencies between the other users.

6. The information processing apparatus according to claim 4,
wherein the correction unit obtains the weight by dividing an average of the communication frequencies between the other users and the reserved user by an average of communication frequencies between the other users.

7. The information processing apparatus according to claim 3,
wherein the correction unit ends the correction if the weight satisfies a predetermined condition.

8. The information processing apparatus according to claim 4,
wherein the correction unit ends the correction if the weight satisfies a predetermined condition.

9. The information processing apparatus according to claim 5,
wherein the correction unit ends the correction if the weight satisfies a predetermined condition.

10. The information processing apparatus according to claim 6,
wherein the correction unit ends the correction if the weight satisfies a predetermined condition.

11. The information processing apparatus according to claim 1,
wherein the correction unit corrects the access frequency of the shared information by the reserved user using a predetermined coefficient that changes over time after the reserved user is determined.

12. The information processing apparatus according to claim 11,
wherein, when the user in the group has left the group, the coefficient decreases over time after the reserved user is determined, and when the user has joined the group, the coefficient increases over time after the reserved user is determined.

13. The information processing apparatus according to claim 1, wherein the processor is further configured to function as:
a setting unit that sets an end condition for ending the correction performed by the correction unit.

14. The information processing apparatus according to claim 2, wherein the processor is further configured to function as:
a setting unit that sets an end condition for ending the correction performed by the correction unit.

15. The information processing apparatus according to claim 3, wherein the processor is further configured to function as:
a setting unit that sets an end condition for ending the correction performed by the correction unit.

16. The information processing apparatus according to claim 4, wherein the processor is further configured to function as:
a setting unit that sets an end condition for ending the correction performed by the correction unit.

17. The information processing apparatus according to claim 5, wherein the processor is further configured to function as:
a setting unit that sets an end condition for ending the correction performed by the correction unit.

18. The information processing apparatus according to claim 13,
wherein the setting unit sets a correction period used by the correction unit as the end condition.

19. An information processing system comprising:
an information processing apparatus including a storage medium and a processor coupled to the storage medium, wherein the processor is configured to function as a presentation unit that gives an importance level to shared information, which is information shared in a group including a plurality of users, and presents the shared information, the importance level becoming higher as an access frequency of the shared information becomes higher and a correction unit that, when the plurality of users in the group are changed and the presentation unit gives the importance level to the shared information, determines a user who has left or joined the group as a reserved user and corrects an access frequency of the shared information by the reserved user to a value calculated using a method different from a method used for the other users; and
a client apparatus that requests the presentation of the shared information and displays the shared information presented by the presentation unit.

20. A non-transitory computer readable medium storing a program causing a computer to execute a process for processing information, the process comprising:
giving an importance level to shared information, which is information shared in a group including a plurality of users, and presenting the shared information, the importance level becoming higher as an access frequency of the shared information becomes higher; and
determining, when the plurality of users in the group are changed and the importance level is given to the shared information in the giving, a user who has left or joined the group as a reserved user and correcting an access frequency of the shared information by the reserved user to a value calculated using a method different from a method used for the other users.

* * * * *